Oct. 31, 1967

T. R. JORRIS 3,349,493

SPACECRAFT STADIMETRIC RANGING DEVICE FOR
MANUAL, AUTONOMOUS, ALTITUDE DETERMINATION
THROUGH A LIMITED FIELD OF VIEW

Filed Aug. 5, 1966

INVENTOR
T. R. JORRIS

BY

Harry A. Herbert Jr.
Charles H. Wagner
ATTORNEYS

Fig 6

United States Patent Office 3,349,493
Patented Oct. 31, 1967

3,349,493
SPACECRAFT STADIMETRIC RANGING DEVICE FOR MANUAL, AUTONOMOUS, ALTITUDE DETERMINATION THROUGH A LIMITED FIELD OF VIEW
Terry R. Jorris, Spring Valley, Minn., assignor to the United States of America as represented by the Secretary of the Air Force
Filed Aug. 5, 1966, Ser. No. 571,153
6 Claims. (Cl. 33—64)

The invention described herein may be manufactured and used by or for the United States Government for governmental purposes without the payment to me of any royalty thereon.

This is a continuation-in-part of my copending application Ser. No. 414,030, filed Nov. 25, 1964, for Spacecraft Stadimetric Ranging Device for Manual, Autonomous, Altitude Determination Through a Limited Field of View.

This invention relates to an apparatus and method for determining the altitude above the surface of a spherical heavenly body, such as the earth, by an observer located in space above the body, and more particularly the invention relates to a spacecraft stadimetric ranging device for manual, autonomous, altitude determination through a limited field of view of the body, having for an object the provision of telescopic sighting means having an optical axis, a predetermined low or one power, a limited known angular field of view having a circular viewing field, and angularly adjustable cross hairs in the viewing field with means operable by angular adjustment between the cross hairs to determine the angular relation between the cross hairs.

A further object of the invention is the provision of means for viewing in space a portion of the rim of a predetermined heavenly body of known diameter, such as the earth, or the moon, to determine the distance to the heavenly body, including a telescope type of sighting means having a central or optical axis with a fixed cross hair extending radially from the central axis to the periphery of the viewing field, and a second movable cross hair extending radially from the central axis to the periphery of the viewing field which is angularly adjustable relative to the fixed cross hair around the central axis to predetermined angular relations to the fixed cross hair, and including means responsive to the predetermined angular adjusted relations between the fixed and adjustable cross hairs for indicating the distances in space from the sighting means to the predetermined or selected heavenly body when viewed through the telescope with the image of the rim of the heavenly body intersecting the central axis at the juncture of the cross hairs and at the remote opposite ends of the fixed and adjustable cross hairs.

A further object includes an adjustable pointer means responsive to angular adjustments between the fixed and adjustable cross hairs including predetermined distance indicating indicia means on the viewing means disposed for cooperative registration with the pointer means for indicating predetermined distances between the sighting device and a predetermined heavenly body of known diameter while the image of a portion of the rim of the body is viewed through the telescope with the rim of the image of the body intersecting the central or optical axis at the juncture of the cross hairs and intersecting the remote visible ends of the fixed and adjustable cross hairs.

A still further object includes an adjustable pointer means responsive to angular adjustments between the fixed and adjustable cross hairs including predetermined distance indicating indicia means disposed for cooperative registration with the pointer means for indicating predetermined distances between the sighting device and at least two different heavenly bodies of known diameters while the image of a portion of the rim of either of the bodies is viewed through the telescope with the rim intersecting the central or optical axis at the juncture of the cross hairs and at the remote visible ends of the fixed and adjustable cross hairs, and common adjusting means for adjusting the adjustable cross hair relative to the fixed cross hair and simultaneously adjusting the pointer relative to the plural distance indicating means for indicating the distances thereon between the sighting means and either of the heavenly bodies in predetermined relation to the angular relation between the fixed and adjustable cross hairs.

A further object is the provision of common adjusting means for adjusting the adjustable cross hair relative to the fixed cross hair and simultaneously adjusting the pointer relative to the distance indicating means for indicating distance thereon in predetermined relation to the angular relation between the fixed and adjustable cross hairs.

A further object of the invention includes distance indicating means in the form of a removable or replaceable mileage indicating card or plate fixed to the sighting device having predetermined distance indicating indicia thereon for registration with the pointer means for selectively indicating distances in space from the sighting device to a heavenly body of predetermined diameter, whereby a similar card or plate calibrated for different distances in space to a different heavenly body of predetermined diameter may be substituted when the image thereof is viewed through the telescope with the central or optical telescope axis and the remote outer visible ends of the fixed and adjustable cross hairs of the telescope intersecting the rim of the image of the selected heavenly body in spaced relation to each other.

A further object of the invention is the provision of a simple, mechanical sighting device which is light in weight and easy to operate, for determining very quickly the altitude of an observer above the surface of a spherical heavenly body of known diameter, in which the system does not require any power other than that which can be provided manually in which the necessary computations are simple and do not require long periods of labor; and the device operates from a limited field of view consistent with feasible spacecraft design, in which the weight and complexity are not prohibitive, and is accurate and simple to operate, and capable of integration with other space navigation equipment.

System reliability is one of the most severe problems of manned space flight. If, in addition to the basic problem it is now required that a man perform a military mission in the space environment, it will increase the need for system reliability by several orders of magnitude. This incraeses the needed reliability, from the military requirement, to "get the job done," regardless of partial or complete system failure.

An attempt to increase system reliability by redundancy carries with it severe weight penalties. Therefore a new method of approach, according to the invention, is employed which precludes the use of power, computers, ground communication, and automatic equipment of all types, and provides a manual approach to the space navigation problem, for only man offers the system reliability needed. In this way the navigator is provided with a simple, self-contained system which uses to a maximum all of the available observables, and allows the military astronaut to complete his assigned tasks, even though he experiences mechanical equipment failure.

Considering for a moment a "near-earth" orbital mission in which the earth's disk spans nearly 180° of the field of view but in any, or almost any orientation it is possible to see the edge or rim of the earth's disk from which stadimetric measurements for altitude or range can be made.

The first concern after "lift off" is the determination of "perigee" radius of the orbit, which must be greater than some predetermined radius of the earth plus atmosphere. Once the distance of closest approach is computed the safety of the orbit is established and the astronaut can devote time and attention to the determinaion of other orbital perimeters, for instance the eccentricity, the period of time, the "apogee" etc. All of these parameters can be derived from the altitude information to completely determine the size and shape of the orbit. The subject invention provides a manual stadimetric measuring device which meets the aforesaid requirements as shown in the accompanying drawings, in which like reference characters refer to like parts in the several figures.

Referring to the drawings, particularly FIGS. 1 to 5 showing one form of spacecraft stadimetric ranging device for manual, autonomous altitude determination through a limited field of view, embodying the invention, in which the reference numeral 1 denotes a manual or portable support in the form of a plate 2 having angular side flanges or plates 3 and 4 extending from the opposite longitudinal edges of the plate 2, preferably at 90°.

Figure 1:
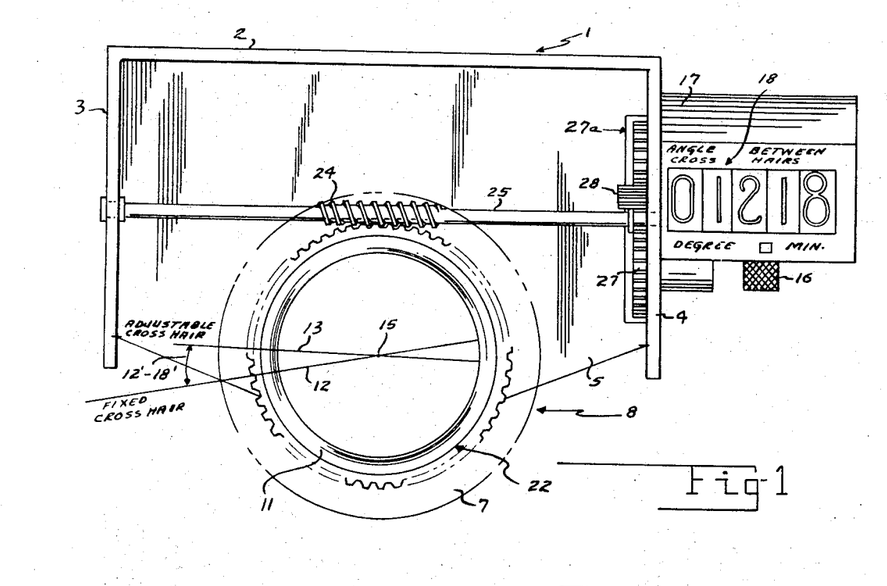
FIGURE 1 is a rear, or observer's end view of the spacecraft stadimetric ranging device for altitude determination above a heavenly body, employing the invention, more particularly disclosing the circular viewing field, the stationary and angularly adjustable cross hairs, the adjusting means, and the angle indicator.
Figure 2:
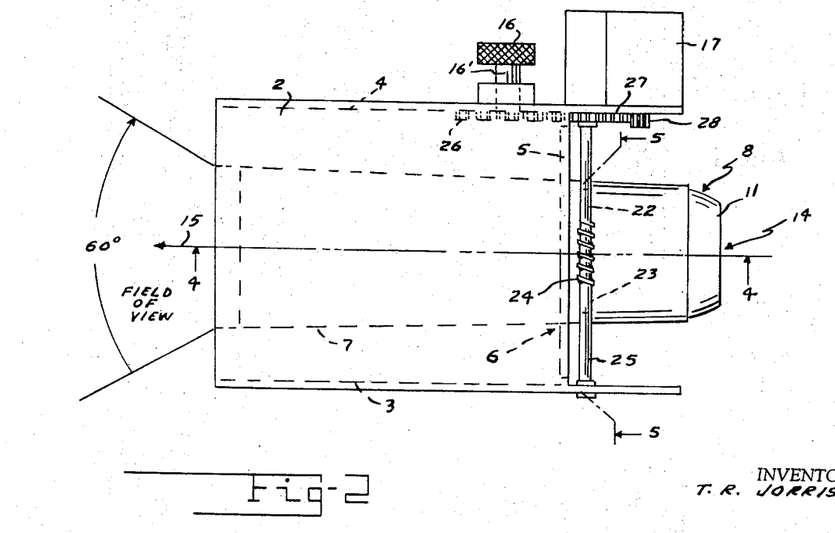
FIGURE 2 is a top plan view of the device, as seen from above the device shown in FIG. 1, but on a somewhat reduced scale.
Figure 3:
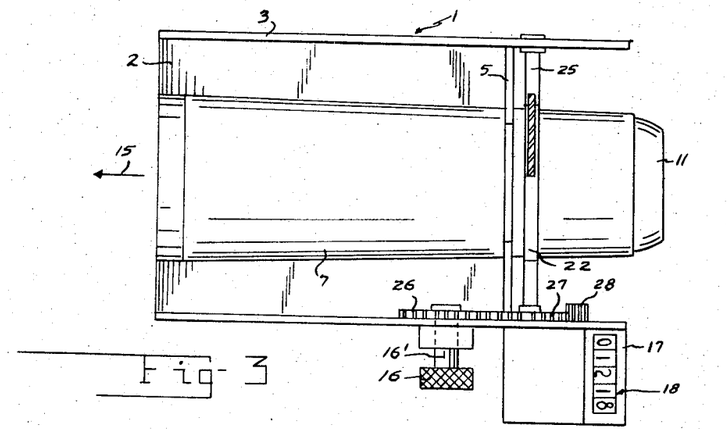
FIGURE 3 is a bottom plan view of the device, as shown in FIGS. 1 and 2, showing the mounting of the telescope in the supporting frame.
Figure 4:
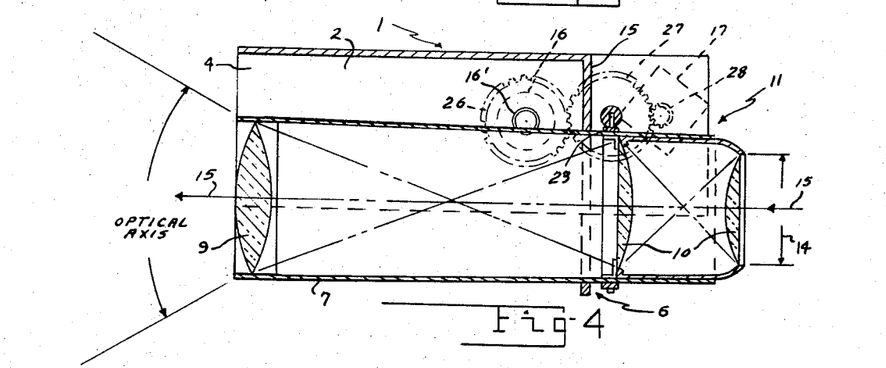
FIGURE 4 is a longitudinal vertical sectional view through the device taken on, or about on, the plane indicated by line 4—4 in FIG. 2, looking in direction of arrows.

A third supporting plate 5 extends transversely across the device between the plates 3 and 4, being secured thereto and to the plate 2. The plate or web 5 as seen in FIG. 4 has an opening 6 therein through which the barrel 7 of the sighting tube or low power telescope 8 (preferably having one power) extends. The barrel 7 is fixed in the opening 6, being secured to the plate 5 by any suitable means (not shown) but it could be soldered or welded in the opening 6.

If desired the front end of the telescope 8 can be fixed to and supported by front portion of the supporting frame 1, for instance by a bracket extending from the front edge of the central portion of the plate 2 to the front end of the telescope barrel or tube 7.

The sighting device, as shown, comprises the somewhat conventional telescope type sighting tube 7 having suitable front lens elements 9, and rear lens units 10 fixed in the axially adjustable eye piece or carrier 11. A pair of intersecting fine cross hairs, 12 and 13, extend diametrically across the interior of the barrel 7 from side to side thereof passing through the central or optical axis 15 of the device and the opposite edges of the field of view 14. The field of view at the inner end or eye piece 11 is indicated at 14 with the lines of the two cross hairs 12 and 13 extending from side to side through the central or optical axis 15 of the telescope and the central of the circular field of view 14.

The cross hair 12 is fixed in position in front of the lens unit 11, passing diametrically across the field of view while the other cross hair 13 is angularly adjustable relative to the cross hair 12 about the center or central axis 15, being manually adjustable by an adjusting knob 16 suitably located in convenient position for the observer on the side flange 4.

An angle indicator, denoted at 17, located on the side plate 4, may be of the "Veeder counter type" and is in "coupled" relation to the knob 16 and the cross hair 13 for continuously indicating the angular relation, at the center of the viewing field, between the fixed and adjustable cross hairs 12 and 13, the angle being displayed through a window opening 18 in the indicator 17 facing the observer as he sights or observes the image of the heavenly body in the circular field of view 14. As seen in the drawing in FIGS. 1 and 3 the angular relation between the cross hairs 12 and 13 as shown has been adjusted to 12 degrees and 18 minutes.

Any suitable drive or adjusting means between the knob 16, the movable cross hair 13 and the angle indicating means may be provided; for instance, as shown, the cross hair 13 may be mounted diametrically across a ring 19 which is suitably journalled for rotation on the inner surface of the telescope barrel 7 in a plane next to the plane containing the fixed cross hair 12.

A pin 20 projects outwardly from the ring 19 through a slot 21 extending around the barrel having the desired length, depending upon the limit of angular displacement between the cross hairs. As shown the slot extends approximately 180°.

The "driving" pin 20 is fixed in or to an annular ring 22 which is journalled on the outer surface of the tube 7 for rotative adjustment, carrying the inner adjustable cross hair carrying ring 19 along with it.

The outer ring 22 has a gear segment 23 meshing with a (low pitch) worm 24 fixed on a shaft 25, perpendicular to the axis of the telescope, with the opposite ends thereof journalled in the side plates 3 and 4, substantially as shown. The length of the worm segment would, of course, depend upon the desired limit of angular adjustment between the cross hairs. As shown the length is a little over 180°.

The adjusting knob 16 is fixed on a shaft 16' which passes through a journal in the plate 4 and a pinion gear 26 is fixed thereon which meshes with an adjusting pinion gear 27 fixed on the worm shaft 25 next to the plate 4. This latter gear 27 also meshes with a small drive pinion 28 for adjusting the angle indicator 17 in proper predetermined ratio to the angular adjustment between the cross hairs 12 and 13. A slot 27a is provided in the supporting plate 5 to accommodate the pinion gear 27.

A detail showing of the interior of the angle indicating device 17 is not thought to be necessary since such mechanisms are well known and it is only necessary to provide the desired ratio of "carry over" between the minutes and degrees (60'=1°) and the proper gear relation in the gear train between the ring (worm gear segment) 22-23 and the indicator input (pinion 28).

Of course, other means than that shown may be provided for adjusting the angular relation between the cross hairs 12 and 13 than that shown and justed described. For instance a pinion might be journalled in an opening in the shell 7 between the inner and outer rings 19 and 22, the rings having outer and inner gear teeth meshing with the intermediate pinion. This would substantially eliminate the 180° slot 21 in the shell 7 but would require a reversal of the pitch of the worm 24.

As before mentioned the altitude of the spacecraft (or observer) above the heavenly body, such as the earth, is a function of the angle between the cross hairs (angle $\alpha$), the known radius of the body (R) subtending the arc between central axis and edge of field of view around the rim of the body when the rim passes through central axis 15 and edge of field of view 14, and the angular field of view 14a of the telescope.

Figures 11, 12, 13:
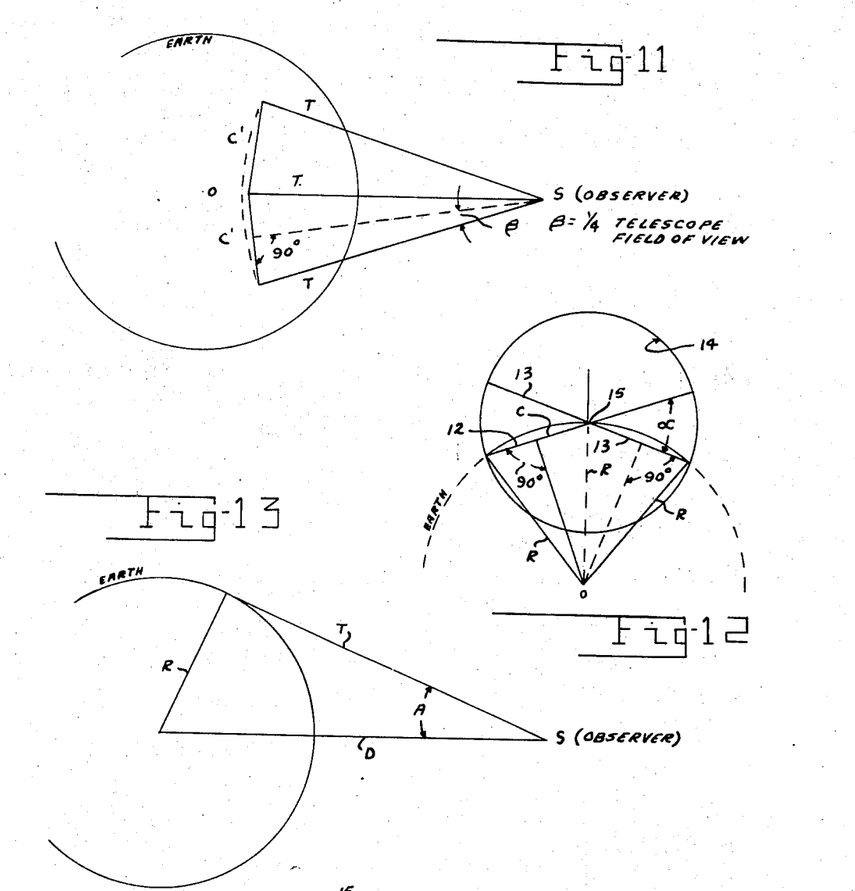
FIGURES 11 to 14 are diagrammatic views for better illustration of the operation and method employed when using the invention to determine the distance above any spherical heavenly body, such as the earth, where the diameter or radius of the body is known and the radius of the image thereof in the viewing field is greater than the radius of the viewing field.
Figure 14:
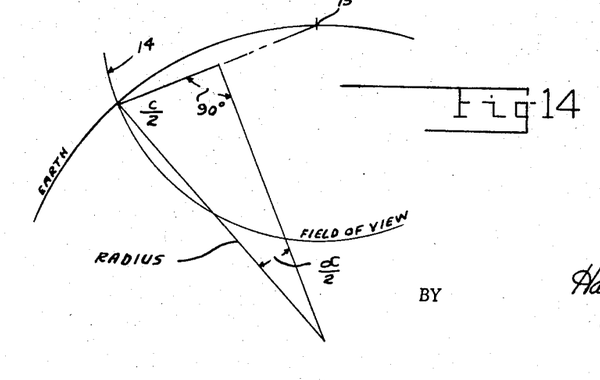

For an example, reference being particularly directed to FIGURES 11 to 14 in which:

R=radius of body (earth)
T=tangent to earth from S
S=location of space vehicle or observer
D=distance of space vehicle S from center of body (earth)
c=chord created by half of cross hair
A=angle between tangent and center c of body
$\beta$=¼ telescope angular field of view From side view (FIG. 13):

$$D = \frac{R}{\sin A} = R \csc A, \text{ where } \tan A = \frac{R}{T}$$

From top view (FIG. 11), $$\sin \beta = \frac{c/2}{T}$$

and from end view (FIG. 12), $$\sin \frac{\alpha}{2} = \frac{c/2}{R}$$

Substituting, $$\tan A = \frac{R \sin \beta}{R \sin \frac{\alpha}{2}}$$

therefore $$A = \arctan \frac{\sin \beta}{\left(\sin \frac{\alpha}{2}\right)}$$

and $$D = R \csc \left[ \arctan \frac{\sin \beta}{\sin \frac{\alpha}{2}} \right]$$

Altitude = $D - R$

Differentiating with respect to $\alpha$:

$$dD = d(R \csc A) = R d(\csc A)$$

$$= -R \csc A \cot A \, dA =$$

$$= -R \csc A \cot A \, d \left( \arctan \frac{\sin \beta}{\sin \frac{\alpha}{2}} \right)$$

$$= -R \csc A \cot A \left[ 1 + \frac{\sin \beta}{\left(\sin \frac{\alpha}{2}\right)^2} \right]^{-1} d \left( \frac{\sin \beta}{\sin \frac{\alpha}{2}} \right)$$

$$= +R \cos A \cot A \left[ 1 + \frac{\sin \beta}{\frac{\alpha}{2}} 2 \right]^{-1}$$

$$\sin \beta \cot \frac{\alpha}{2} \csc \frac{\alpha}{2} \frac{d\alpha}{2}$$

$$dD = \left[ \frac{R \csc A \cot A \sin \beta \cot \frac{\alpha}{2} \cos \frac{\alpha}{2}}{2 \, 1 + \frac{\sin \beta}{\left(\sin \frac{\alpha}{2}\right)^2}} \right] d\alpha$$

For example, assuming:

(1) Telescope power to be 1 (one),
(2) Telescope field of view 60° (=4$\beta$),
(3) Radius of earth 3440.19 N.M. (nautical miles),
(4) $\alpha$ angle between cross hairs=12°–18'.

Using CRC tables and slide rule:

$$D = R \csc \left[ \arctan \frac{\sin \beta}{\left(\sin \frac{\alpha}{2}\right)} \right]$$

$$D = (3440.19) \csc \left[ \arctan \frac{\sin 15°}{(\sin 6°9')} \right]$$

$$D = (3440.19) \csc [\arctan (2.356)]$$

$$D = (3440.19) \csc 67° \frac{3440.19}{.9205} = 3739 \text{ N.M.}$$

Altitude = $D - R$ = 3739 − 3440 = 299 N.M.

299 N.M. = altitude above surface of body.

The above is the extent of computation required by the observer for an altitude measurement, however, since the power, angular field of the device is fixed and constant, where it is intended for use with only one heavenly body of known radius, the device may be mechanized to read out D or altitude directly, eliminating the necessity for any in flight altitude computations by the navigator (or observer).

As before mentioned the device is useful for determining the altitude above any spherical body of known diameter where the diameter of the image of the body is greater than the radius of the viewing field or screen 14.

Figure 6:
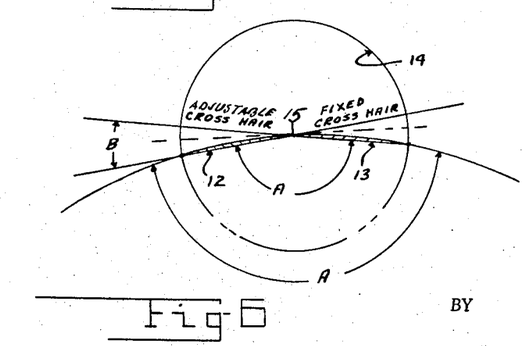
FIGURE 6 is a diagrammatic, or schematic view of the circular viewing field of the device when the cross hairs are adjusted to register on cords on the rim of a spherical heavenly body, such as the earth, passing through the central axis and opposite edges of the circular viewing field, when the diameter of the image is very large, compared to the diameter of the viewing field, and the angle between cross hairs is small.
Figure 7:
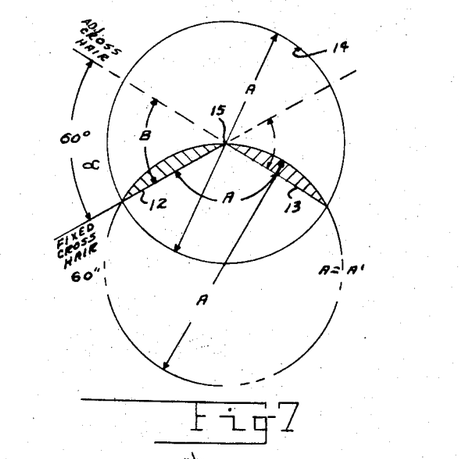
FIGURE 7 is a view similar to FIG. 6, but when the diameter of the image of the body is substantially the same as the diameter of the viewing field, increasing the angle between the cross hairs.

FIGURE 6 illustrates that radius of the image of the body in the viewing field is very great as compared to the radius and diameter of the viewing field 14 while FIG. 7 illustrates the condition where the altitude is greater and the radius of the image of the body is about equal to the radius of the viewing field 14.

Figure 8:
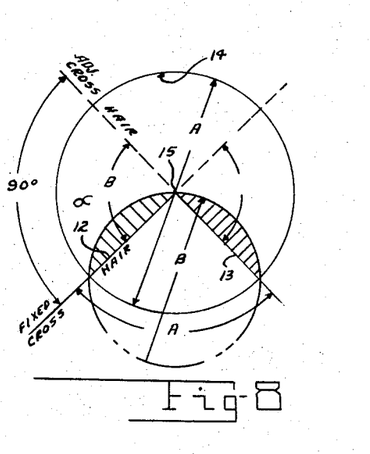
FIGURE 8 is a similar view of the viewing field, but at an increased distance above the body where the diameter of the image of the body is smaller, but still exceeds the radius of the viewing field showing the angle between the cross hairs increased.
Figure 9:
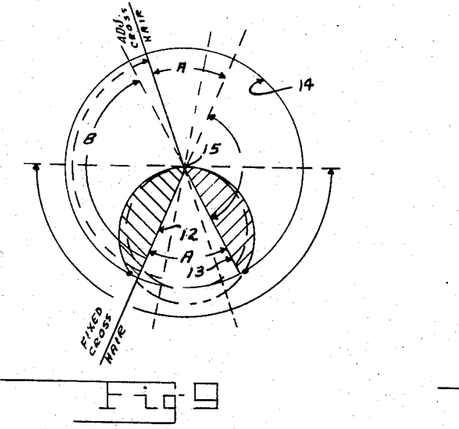
FIGURE 9 is a view where the image of the body is still smaller, illustrating that with reduction in size of the image the angle between the cross hairs becomes greater.
Figure 10:
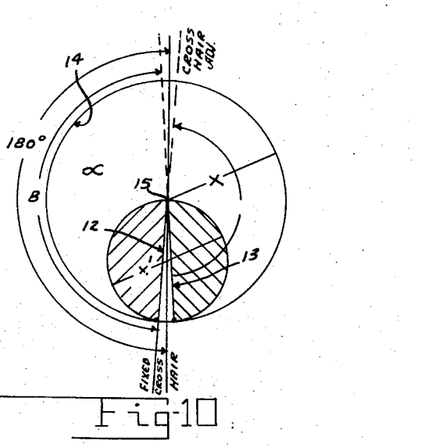
FIGURE 10 illustrates the instrument viewing field of the observer above a spherical heavenly body, where the diameter of the image of the body approaches, but does not exceed the radius of the viewing field, showing that the angle between the cross hairs approaches 180° when the diameter of the image approaches the radius of the viewing field.

FIGS. 8 and 9 illustrate the image of the body in the viewing field at progressively further increased altitudes, while FIG. 10 shows the further increase in altitude where the diameter of the image approaches the radius of the viewing field (and the angle α between the cross hairs 12 and 13 approaches 180°). Obviously this approaches the limit for the use of the device.

While the device is shown as having two cross hairs extending diametrically across the viewing field it is contemplated that the fixed cross hair 12 may extend from the center 15 to one edge of the field 14 while the adjustable cross hair 13 extends from the center 15 to the edge of the field 14, in which event the angle α used in the above calculations would be 180° less the angle at the center between the two (short) or half cross hairs just mentioned.

Assuming that the maximum error in alignment of any of the three points (center point and two edges in field 14), plus the deviation in earth's horizon or "green line" does not exceed 30 seconds of arc it can be proven that the error is less than 1 percent.

The system and method proposed meets the requirements for a feasible manual navigation system for spacecrafts needing no other power, and the computations are few and simple, also the device can be operated from a limited field of view where the body (image) is large, and can even be designed to view through a porthole. Weight and complexity are not prohibitive and therefore cost of manufacture is low because of its simplicity, the device not execeeding the size and weight of a small hand held sextant, and information derived can readily be used as inputs to projected navigational systems, giving accuracy consistent with the objectives of manual space navigation with minimum likelihood of failure or error.

Figure 15:
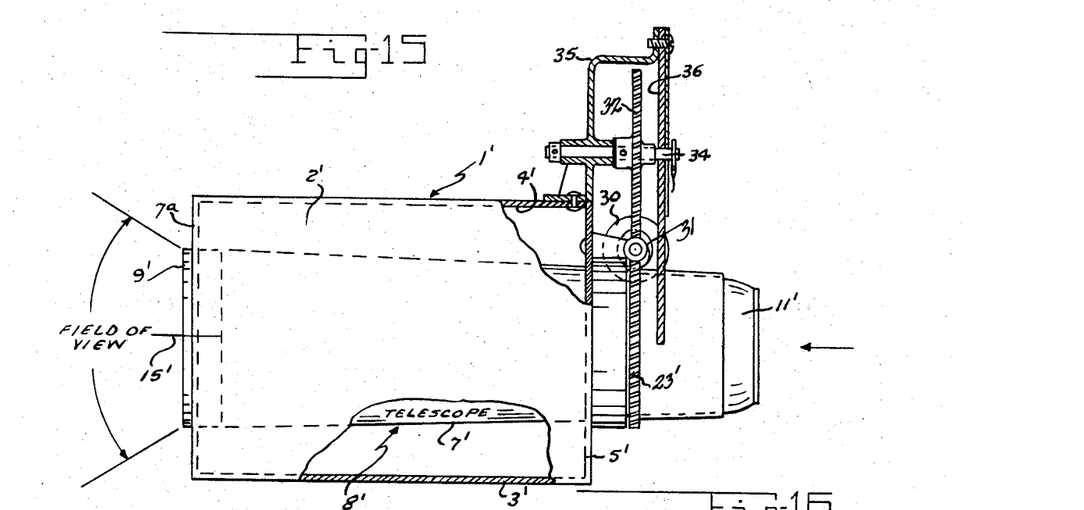
FIGURE 15 is a top plan view of a modified form of the invention, including means for directly indicating the distance between two spaced predetermined heavenly bodies of known diameter such as the earth and its moon, parts being broken away and shown in section.
Figure 16:
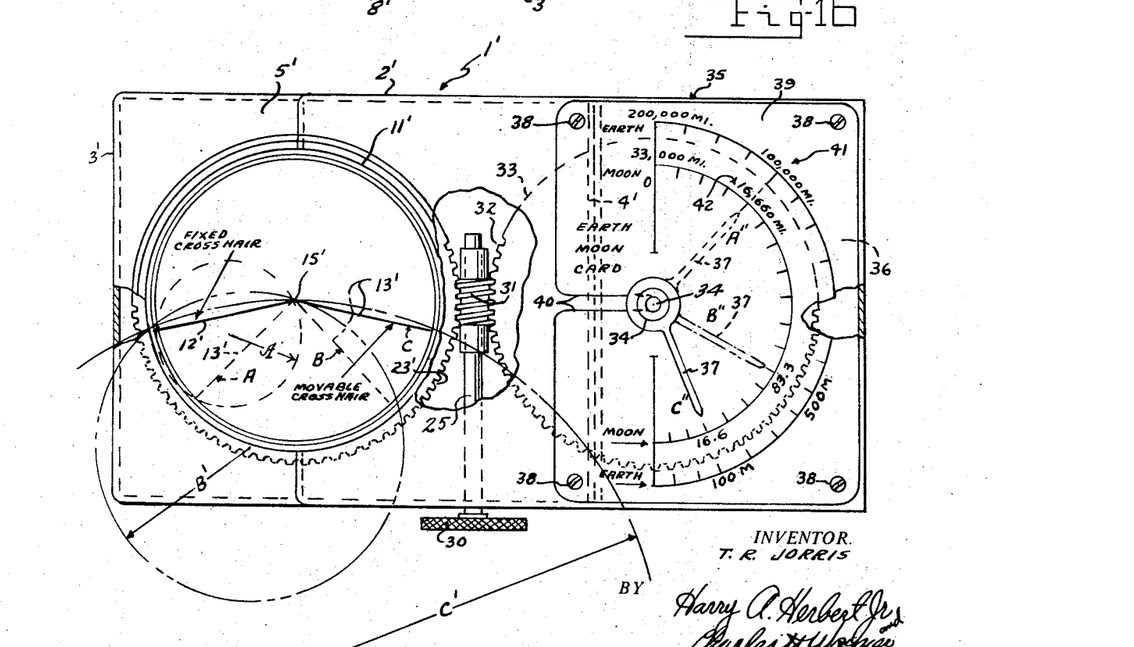
FIGURE 16 is a front elevation of the device shown in FIG. 15, parts also being broken away and shown in section, and schematically showing three "distance settings" respectively in dotted lines, dot and dash lines, and in full lines.

Referring to FIGS. 15 and 16, the reference numeral 1' denotes a portable support, similar to that shown at 1 in FIGS. 1 to 4, being in the form of a plate 2' having angular side flanges 3' and 4' and a third transverse supporting plate 5' which supports the rear end of the barrel 7' of the sighting or telescope device 8'. If desired the front end of the barrel 7' may also be supported by a front plate 7a depending from the top frame plate 2' in addition to the rear plate 5'.

The telescope or sighting device 8' as shown comprises the somewhat conventional telescope, preferably of low or one power as before described, having the usual front lens element 9' and rear lens element fixed in the axially adjustable or focusing eye piece 11'.

A pair of intersecting cross hairs 12' and 13' extend radially from the central or optical axis 15' to the side or rim of the unobstructed field of view through the telescope device 8'.

The cross hair 12' is fixed in position in front of the lens element of the eye piece 11' while the cross hair 13' is angularly adjustable around the central axis 15'. For instance it is carried on an inner ring such as 19 in FIG. 5 which is suitably journalled for rotation on the inner surface of the telescope barrel 7' in a plane next to the plane containing the fixed cross hair 12', or the cross hairs may be inscribed on transparent glass plates (not shown) carried by the adjustable ring and a fixed ring on the inner surface of the barrel 7'.

Figure 5:
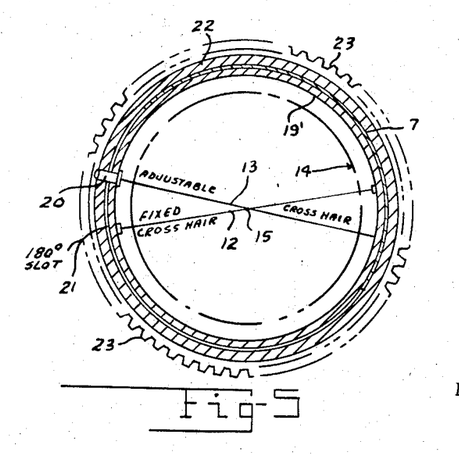
FIGURE 5 is an enlarged transverse detail sectional view taken about on the plane indicated by line 5—5 in either FIGS. 2 or 4, more particularly showing an arrangement for mounting the cross hairs in the field of view.

The barrel 7' may have a substantially semi-circular slot with a pin, like the pin 20 shown in FIG. 5, which pin extends through the slot, being connected at its inner end to the ring, like the ring 19, and connected at its outer end to a (low pitch) worm gear segment ring 23' journalled on the outer periphery of the barrel substantially similar to that shown in FIGS. 4 and 5. Adjustment of the worm gear segment 23' therefore adjusts the angular relation of the adjustable cross hair 13' to the relatively fixed position of the other cross hair 12' through any suitable angle, for instance up to about 180°.

The frame or support 1' carries a cross hair adjusting vertical shaft 25' having an adjustment thumb wheel or disk 30 on its lower end and a worm 31 is fixed on this shaft in meshing relation with the worm gear segment annular ring 23'. Thus rotative adjustment of the thumb wheel 30 adjusts the angular relation of the adjustable cross hair 13' around the central axis 15' relative to the fixed cross hair 12', for instance to the positions A, B or C as seen in FIG. 16, and is contemplated in FIGS. 7 to 10.

A heavenly body is viewed in space through the eye piece 11' with the rim of the image of the body passing through the central axis 15' and the outer ends of the fixed and adjustable radial cross hairs are adjusted to intersect the rim of the image at the edge of the field of view as seen at A, B, or C, depending upon the distance and apparent size of the body indicated schematically at A', B', or C', shown respectively in dotted, dot and dash, and full lines in FIG. 16, to determine the distance in miles to the body.

The worm 31 meshes with a second worm gear segment or disk 32 which is similar in size and pitch to the worm segment 23' that is formed on a disk 33 that is fixed on a shaft 34 which is journalled in an extension frame 35. The extension frame 35 has a front or face plate 36 through which the shaft 34 extends.

The front end of the shaft 34 has a pointer or distance indicator hand 37, also seen in full line, dot and dash, and dotted line position C", B" and A", for the adjustable cross hair to positions C, B and A respectively.

Removably mounted on the face or front plate, for instance by suitable fastenings 38, is a distance indicating indicia chart or sheet 39 which is slotted at 40 to permit removal or replacement without removal of the pointer 37.

The removable distance indicating chart or sheet 39 is semi-circularly calibrated, for instance as indicated at 41 and 42 for indicating cooperation with the pointer 37 in relation to the various adjusted angular relations between the fixed and adjustable cross hairs 12' and 13' when observed in the unobstructed field of view and located to intersect the rim of the image of the heavenly body, such as the earth or the moon at the three points, namely at the central axis 15' and at the outer ends of the cross hairs.

In a space craft leaving the earth or returning to the earth the earth indicia scale 41 would, of course, be used. While approaching or leaving another body such as the moon, or the other heavenly body, the other indicia scale 42 would be used.

For instance with the hair lines 12' and 13' in the positions indicated schematically at C the distance from the earth (about 100 miles) would be indicated, but when approaching or leaving the moon with the hair lines cutting the image of the rim of the smaller (moon) body of known diameter the distance (about 16.6 miles) would be indicated by the same position of the pointer, but on the other concentric mileage scale 42.

When the distance to any other body or a different planet of known diameter is contemplated another mileage indicia sheet like 39 would be substituted having the necessary differently calculated semi-circular concentric mileage indicia scale 42, for similar registration by the pointer 37.

While only two concentric mileage indicia scales 41 and 42 are shown in FIG. 16, it is obvious that the replaceable sheets 39 may be provided with a greater number of concentric semi-circular scales for future space journeys to other planets or heavenly bodies (of known diameters). Also by reducing the diameter of the worm gear 33, for instance to half the diameter of worm gear ring 23', the scales 41 and 42 could be made longer so that the mileage indicating indicia 41 and 42 could be spread out over about 360°, instead of 180° as shown in FIG. 16.

For purposes of exemplification a particular embodiment of the invention has been shown and described to the best understanding thereof. However, it will be apparent that changes and modifications in the arrangement and construction of the parts thereof may be resorted to without departing from the true spirit and scope of the invention as defined in the accompanying claims.

I claim:

1. The method for obtaining data from which the altitude of an observer above a spherical heavenly body of known diameter comprising positioning a sighting device having a predetermined viewing angle and two intersecting cross hair lines is in the line of sight with one point of said cross hair lines is in the line of sight with one point on the rim of said spherical heavenly body and the end of one of said cross hair lines is in line with a second point at a predetermined viewing angle from said one point on the rim of said heavenly body, rotating the second of said cross hair lines without disturbing the relative position of the first cross hair line to the rim of the heavenly body, until the end of the second cross hair line is in alignment with a third point at a predetermined angle equal to said predetermined viewing angle from said one point on the rim of said heavenly body, and providing an indication of the angle between said cross hair lines.

2. The method for determining the altitude of an observer above a spherical heavenly body of known diameter comprising positioning a sighting device having a predetermined viewing angle and two intersecting cross hair lines in a position such that the intersection of said cross hair lines is in the line of sight with one point on the edge of said spherical heavenly body and the end of one of said cross hair lines is in line with a second point at a predetermined viewing angle from said one point on the edge of said heavenly body; rotating the second of said cross hairs without disturbing the relative position of the first cross hair line to the edge of the heavenly body until the end of the second cross hair is in alignment with the third point at a predetermined angle equal to said predetermined viewing angle from said one point on the edge of said heavenly body and providing an indication of the altitude of said observer above said spherical heavenly body according to the following function:

$$D - R = \text{altitude}$$

$$D = R \csc \left[ \text{arc tangent} \frac{\sin \beta}{\sin \frac{\alpha}{2}} \right]$$

in which

R = radius of body
D = altitude above center of body
T = tangent to edge of body
α = 180° less angle between the selected points on the edge of the body
β = ½ angle from observer above the body along tangents to two adjacent selected points on edge of the body at the end of one of the chords subtended by arcs between the adjacent points on the edge of the body.

3. A method for obtaining data from which the altitude in space above a heavenly body of known diameter is determined which comprises selecting three equally spaced points on the rim of the body located in a predetermined angle from an observer's position to form two adjoining chords on the body subtended by the rim of the body between the three equally spaced points to provide a predetermined angle between the chords, subtracting said angle from 180° to provide two tangents from the observer to two of said three spaced points on the rim of said body and solving the distance from the observer to the body by the following function:

$$D - R = \text{altitude from the observer to the body}$$

$$D = R \csc \left[ \text{arc tangent} \frac{\sin \beta}{\sin \frac{\alpha}{2}} \right]$$

in which

R = radius of body
D = altitude of observer above center of body
T = tangent to rim of body
α = 180° less angle between chords extending between said three selected points on the rim of the body
β = ½ the angle from observe above the body along said tangents to two adjacent selected points on the rim of the body at the ends of one of the aforesaid chords subtended by the arcs between the points on the rim of the body.

4. A sighting device for determining the distance in space from an observer to a predetermined spherical heavenly body of known diameter, said sighting device having a predetermined angular substantially unobstructed field of view therethrough having a central optical axis, a fixed cross hair in the field of view extending radially from the central axis to the edge of the field of view, an adjustable cross hair extending radially from said central axis to the edge of the field of view and adjustable around said central axis to predetermined angular relations to said fixed cross hair, distance indicating indicia means carried by said sighting device calibrated to indicate predetermined different distances from the sighting device to said predetermined heavenly spherical body of known diameter in relation to predetermined angular relations between said fixed and adjustable cross hairs when the line of sight on the central axis intersects a point on the rim of an image of the aforesaid heavenly body in the field of view and the rim of the heavenly body intersects the outer ends of the fixed and adjustable cross hairs at the edge of the field of view, an adjustable pointer for registration with said distance indicia, and manual adjusting means operatively connected to said pointer and said adjustable cross hair for simultaneous adjustment of said adjustable cross hair and said pointer in predetermined relation to the angular relation between said fixed and adjustable cross hairs in said unobstructed field of view when an image of said body is positioned in the field of view with the central axis intersecting the rim of the image of the body and the ends of the cross hairs intersecting the rim of said image at the edge of the field of view.

5. A sighting device substantially as set forth in claim 4 in which said distance indicating indicia means comprises a removable distance indicia carryng card havng at least one circular ring of predetermined distance indicia thereon for registration with said pointer for indicating different predetermined distances from the sighting device to the predetermined heavenly spherical body when the heavenly body is at different predetermined distances, with the image thereof in the field of view, with the central axis at the intersecting ends of the cross hairs disposed in intersecting relation to the rim of the body image and the other ends of the fixed and adjustable cross hairs at the edge of the field of view disposed in intersecting relation to the rim of the image of the body at equally spaced points on the rim at opposite sides of the intersection of the central axis with the rim.

6. A sighting device as set forth in claim 5 including means for indicating the distance in space from an observer to at least two spherical heavenly bodies of predetermined known different diameters in which said removable distance indicia carrying card has at least two circular rings of different predetermined distance indicia thereon for simultaneous registration with said pointer for indicating at least two predetermined different distances from the sighting device to at least two different predetermined heavenly spherical bodes of different predetermined known diameters when either of said bodies is viewed through the sighting device at different distances in the field of view of the sighting device with the central axis at the intersecting ends of the cross hairs disposed in intersecting relation to the rim of the image of either body and the other ends of the fixed and adjusable cross hairs at the edge of the field of view disposed in intersecting relation to the rim of the image of either predetermined body at equally spaced points on the rim at opposite sides of the intersection of the central axis with the rim.

References Cited

UNITED STATES PATENTS

| | | | |
|---|---|---|---|
| 613,566 | 11/1898 | Farrand | 33—64 |
| 2,145,347 | 1/1939 | Everitt | 33—70 |
| 2,162,767 | 6/1939 | Thurlow | 33—70 |
| 2,311,769 | 2/1943 | Mitchell | 33—71 X |
| 2,690,015 | 9/1954 | Edwards | 33—70 |
| 3,002,278 | 10/1961 | Weems | 33—61 |
| 3,199,197 | 8/1965 | MacLeod et al. | 33—64 |

LEONARD FORMAN, *Primary Examiner.*

WILLIAM D. MARTIN, JR., *Assistant Examiner.*